(12) United States Patent
Dawson et al.

(10) Patent No.: US 6,230,198 B1
(45) Date of Patent: May 8, 2001

(54) SERVER-TO-SERVER EVENT LOGGING

(75) Inventors: Colin Scott Dawson; Michael Allen Kaczmarski; Bonnie Jean Vining; Donald Paul Warren, Jr., all of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/150,339

(22) Filed: Sep. 10, 1998

(51) Int. Cl.[7] .............................. G06F 15/16; G06F 15/76
(52) U.S. Cl. ...................... 709/224; 709/106; 709/224; 709/237; 709/248; 709/300; 707/4; 707/48; 710/220; 702/189
(58) Field of Search ...................................... 709/106, 201, 709/224, 225, 237, 248, 253, 300; 714/48, 4; 707/202; 710/220; 702/189

(56) References Cited

U.S. PATENT DOCUMENTS

| | | | |
|---|---|---|---|
| 5,452,433 | * | 9/1995 | Nihart et al. . |
| 5,568,471 | * | 10/1996 | Hershey et al. . |
| 5,621,892 | | 4/1997 | Cook .................................. 395/200.1 |
| 5,633,916 | | 5/1997 | Goldhagen et al. .................... 379/67 |
| 5,634,016 | | 5/1997 | Steadham, Jr. et al. ............. 395/329 |
| 5,661,516 | | 8/1997 | Carles ..................................... 348/8 |
| 5,721,825 | * | 2/1998 | Lawson et al. . |
| 5,740,231 | | 4/1998 | Cohn et al. ............................. 379/89 |
| 5,742,762 | * | 4/1998 | Scholl et al. . |
| 5,748,883 | * | 5/1998 | Carlson et al. . |
| 5,758,083 | * | 5/1998 | Singh et al. . |
| 5,764,886 | * | 6/1998 | Danielson et al. . |
| 5,777,549 | * | 7/1998 | Arrowsmith et al. . |
| 5,781,737 | * | 7/1998 | Schmidt ............................... 709/224 |
| 5,805,785 | * | 9/1998 | Dias et al. . |
| 5,835,700 | * | 11/1998 | Carbonneau et al. . |
| 5,867,659 | * | 2/1999 | Otteson ............................... 709/224 |
| 5,892,898 | * | 4/1999 | Fujii et al. . |
| 5,893,083 | * | 4/1999 | Eshghi et al. . |
| 5,930,476 | * | 7/1999 | Yamuunachari et al. ............ 709/224 |
| 5,941,996 | * | 8/1999 | Smith et al. . |
| 5,944,782 | * | 8/1999 | Noble et al. . |
| 5,991,806 | * | 11/1999 | McHann, Jr. ........................ 709/224 |
| 5,991,881 | * | 11/1999 | Conklin et al. . |
| 5,996,010 | * | 11/1999 | Leong et al. . |
| 6,003,078 | * | 12/1999 | Kodimer et al. . |
| 6,026,500 | * | 2/2000 | Topff et al. . |
| 6,031,895 | * | 2/2000 | Cohn et al. . |
| 6,046,742 | * | 4/2000 | Chari . |

* cited by examiner

Primary Examiner—Robert B. Harrell
Assistant Examiner—Stephan Willett
(74) Attorney, Agent, or Firm—John H. Holcombe; Robert M. Sullivan (57) ABSTRACT

Disclosed are a method, embodiable in computer readable program code, and a system for providing server-to-server event logging. A server-to-server event message is generated including 1) an event identifier, 2) any text insert pertinent to the event message, and 3) a source trail indicating the origin and history of the event, the source trail comprising an identifier of any server forwarding the event, each identifier separated by a special character, so that the origin and any subsequently transmitting servers may be known. Further, the source trail of a received server-to-server event message is parsed to determine each identifier in the source trail, and the event message transmitted to a receiving server only if the receiving server identifier is absent from the parsed source trail, thus preventing any loops which might cause the event to be repeated. Additionally, a receiving server has a listing of events by event identifier with corresponding text messages in the text language of the receiving server. The received event identifier is found in the listing, and the receiving server logs the event, using the identified text message in the listing in the text language of the receiving server, and employing the text inserts.

20 Claims, 3 Drawing Sheets

SERVER-TO-SERVER EVENT LOGGING

TECHNICAL FIELD

This invention relates to servers comprising computer processor systems, such as in a distributed or network systems environment, and, more particularly, to the logging of events, which is the distribution of messages relating to a server, between servers.

BACKGROUND OF THE INVENTION

The distributed or network environment of computer processor systems typically comprises a large number of individual nodes, such as workstations, PC's, terminals, host computers, and data storage components, which are tied together across a network. Also typically, the distributed or network systems comprise remotely located clients tied together to utilize common data storage components. The management of the data for efficient storage and retrieval is a critical element of the operation of the network.

One type of network is that employed to provide a backup and archive storage system for remotely located clients. Backup protects the client system data from a system failure or disk crash. The data is typically first moved to disk drives and then migrated to tape as the need for access to the data becomes less immediate. Archive storage is data that won't have a copy in the originating client system. It is archived so that the data may be made available if it is ever needed, for example, for legal requirements. Data is typically archived on tape.

One system designed to store and manage data for remotely located clients is called the ADSTAR Distributed Storage Manager (ADSM) of IBM. In ADSM, a central server is coupled to multiple client platforms and one or more administrators. The server provides archival, backup, retrieval, and other management functions for the server's clients. Should an error situation arise, that message may be provided to the server system administrator as an "event" or an "alert". In server system parlance, an "event" is any message relating to the server system, including those messages, called "alerts", which require attention.

Often, network or distributed systems are hierarchical in nature, having separate servers at local sites reporting to a regional headquarters and coupled to the regional headquarters servers, and having separate servers at the regional sites reporting to an area headquarters and coupled to the area headquarters servers, etc. However, one or more of the servers at an area site may themselves be "local" servers. Thus, if an event at a "local" server is of sufficient importance that it should be reported to the region and/or to the area headquarters, the event may be reported by sending it from the local server to the region server and then to the area server for distribution to receivers at the region and area.

For example, the information systems administrator for a region, an area, or an enterprise may wish to know that a local server is running out of available storage, so that an order for increased storage capacity may be economically coordinated.

It may be possible to make ones of the servers in the system a client for other servers, and the other servers receivers for the client servers. For example, U.S. Pat. No. 5,621,892, Cook, has registration procedures for the registration of devices, as clients and as receivers for expected alerts, and configures a map between registered alerts and registered service providers for the distribution of events when they occur. The registration and mapping occurs at a standard initial set up for the system.

Tracking and understanding the events and determining the source and nature of the event can become difficult in a complex enterprise, especially one in which the sites are in different countries having different languages, and the possibility exists that the same event may be reported more than once around the system which may unnecessarily tie up system resources.

SUMMARY OF THE INVENTION

It is an object of the present invention to provide server-to-server event logging wherein events are distributed to receivers requiring the information while clarifying the source of the information.

It is another object of the present invention to assure that the same event is received only once at any one server.

It is still another object of the present invention to provide server-to-server event logging in the language of the site receiving the event.

Disclosed are a method, a system, an article of manufacture comprising a computer readable medium having computer readable program code embodied therein, and a computer program product for providing server-to-server event logging, between a present server and a receiving server, upon receiving an event at the present server for which the receiving server is a receiver. A server-to-server event message is generated for the received event, the message including 1) an event identifier, 2) any text insert pertinent to the event message, and 3) a source trail indicating the origin and history of the event, the source trail comprising a) any source trail from a sending server received with the event, or b) if received directly from a client, the identifier of the client supplying the event, and c) an identifier of the present server, each separated by a special character. The generated server-to-server event message is then transmitted to the receiving server, so that the origin and any subsequently transmitting servers may be known in the distribution by the receiving server.

In another aspect of the present invention, the source trail of the received server-to-server event message is parsed to determine each identifier in the source trail. The event message is transmitted to the receiving server only if the receiving server identifier is absent from the parsed source trail, thus preventing any loops which might cause the event to be repeatedly received.

In still another aspect of the present invention, server-to-server event logging is provided between a sending server and a receiving server, wherein the receiving server has a primary text language. A server-to-server event message received at the receiving server from the sending server includes 1) an event identifier, and 2) any text insert pertinent to the event message. The receiving server has a listing of events by event identifier and corresponding text messages in the primary text language of the receiving server. The receiving server identifies, in response to the received server-to-server event message event identifier, the event and corresponding message in the listing. Then, the receiving server logs the received server-to-server event, employing the identified text message in the listing in the text language of the receiving server, and employing the text inserts.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
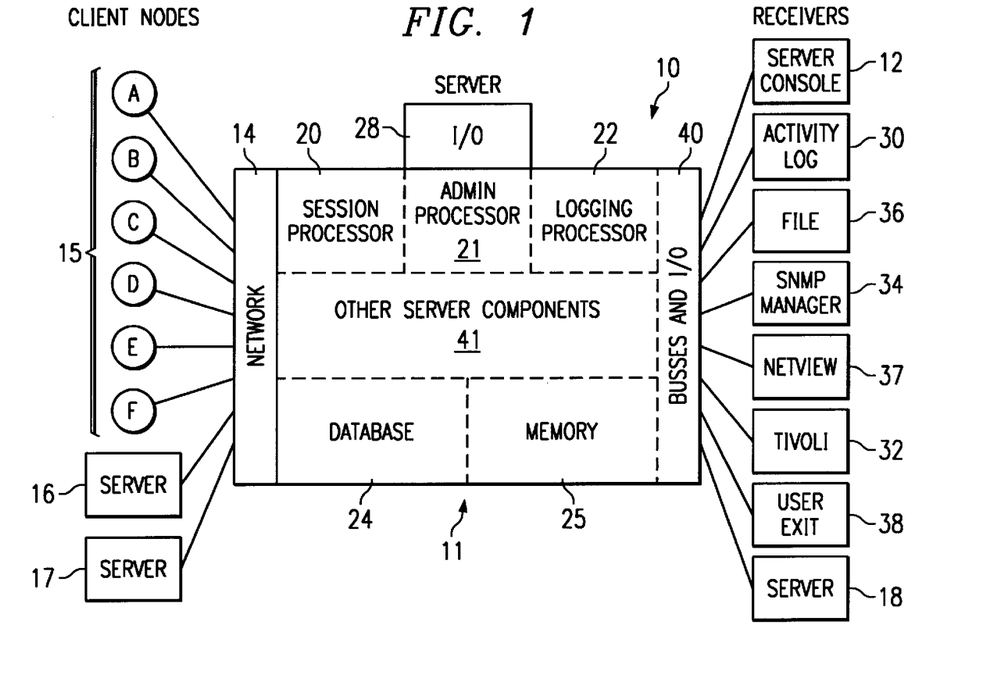
FIG. 1 is a block diagrammatic representation of a server of the present invention with coupled client nodes and receivers, including other servers.
Figure 2:
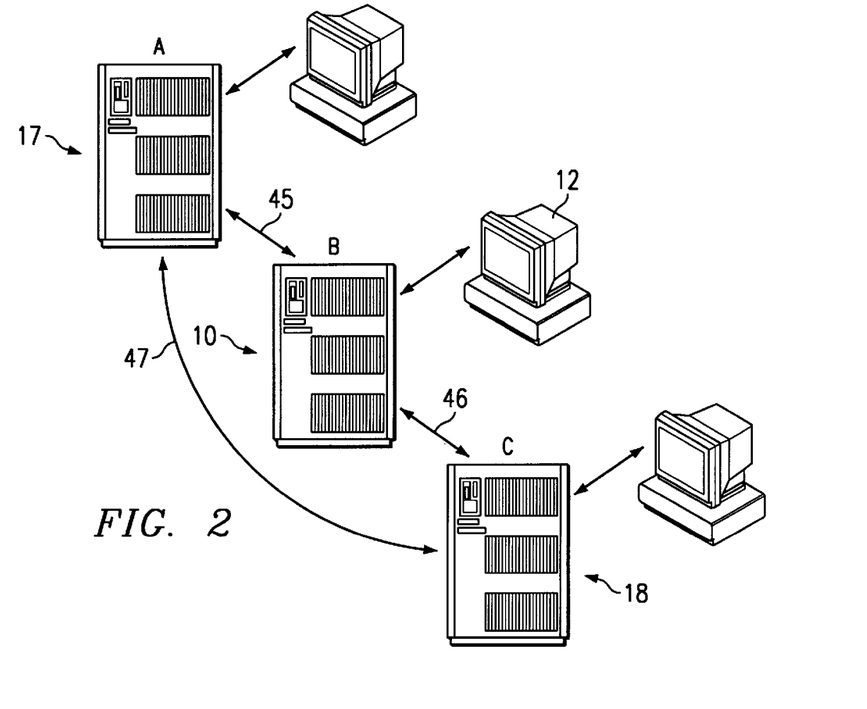
FIG. 2 is a diagrammatic illustration of an embodiment of multiple servers of FIG. 1 coupled for transmission of server-to-server events in accordance with the present invention.

Referring to FIG. 1, server 10 (often called a server subsystem) may comprise a network server, a data storage server, other type of server, or a combination. The hardware employed for the server 10 may comprise one or more general purpose computers 11, and attached devices such as a server console 12. The server is connected over a network 14 to a number of clients at client nodes 15. Referring to FIGS. 1 and 2, in accordance with the present invention, the server 10 may additionally be coupled to one or more servers 16 and 17, which are registered with the server 10 as clients. Also, the server 10 may be coupled to a single server 18 which is registered with the server 10 as a receiver of information from the server 10, as will be explained.

The operation of the subsystem is accomplished through a number of software components, including, for example, a session processor 20, an administrative processor 21, and a logging processor 22. The software components employ at least one database 24, which may comprise one or more hard disk drives, and the computer memory 25. The software may be supplied with the computer 11 configured as a complete subsystem or may be added at I/O 28.

An example of a server 10 is called the ADSTAR Distributed Storage Manager (ADSM) of IBM, which is a computer program product application running on the operating system of the computer processor 11, designed to store and manage data for remotely located clients. The server provides archival, backup, retrieval, and other storage management functions for the server's clients. One example of a computer processor 11 is an IBM RS/6000 computer processor. Other examples of storage managers include MVS mainframes, UNIX processors, or Windows NT systems running with appropriate computer program products. Client systems can vary from small personal computer systems and workstations to large data processing host systems.

Figure 3:
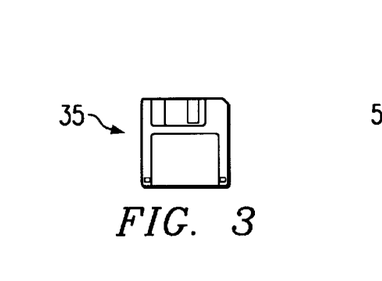
FIG. 3 is an illustration of a storage medium for storing computer executable instructions.

Referring to FIGS. 1 and 3, the computer program product (s) may be supplied at I/O station 28 from a storage medium 35 which stores executable computer instructions. The illustrated example of a storage medium which is an article of manufacture is a magnetic diskette. Other suitable storage media are optical disk cartridges, magnetic tape cartridges, removable hard disk cartridges, read only memories (ROM) or programmable read only memories (PROM). The requirement for the storage media or memories is that they store digital representations of computer executable instructions. The computer program product may alternatively be supplied with the hardware or supplied electronically, as from a client network 15. The computer program products and processor operating system may be temporarily stored in memory 25.

Referring to FIGS. 1 and 2, the server 10 is managed by an administrator, for example, at the server console 12. Typically, the administrator employs a graphical user interface (GUI) to enter commands for managing the server.

The session processor 20 manages all the sessions between the clients 15 and other servers 16 and 17, and server 10. The administration processor 21 handles the commands from the administrator(s), for example at the server console 12.

Typically, the events are passed from clients to the server for output to receivers by means of "events" or messages. A data storage server, such as ADSM, must organize and track data stored by the subsystem, and must protect that data. The server must have sufficient resources available in order to store the required data on the required media. Various "receivers" are typically provided to receive certain of the events. Still referring to FIGS. 1 and 2, examples of receivers which are part of the server subsystem include the server console 12, and an activity log 30, which may comprise part of the ADSM database also stored on a disk file for the computer processor 11. The activity log stores events and allows them to be queried later, for example, by querying the activity of a particular node, or a particular time period.

Examples of external receivers may include an enterprise system management application 32, such as Tivoli Enterprise Console (TEC), and an "alert" or "trap" manager 34, such as a conventional Simple Network Management Protocol (SNMP) manager. Typically, the users of the TEC or SNMP are only interested in the more significant messages or those that may require urgent attention. Other external receivers depicted as receivers 35 in FIG. 2 include, for example, an external file 36, a "Netview" manager 37, and a user exit 38, depicted in FIG. 1. The user exit 38 may comprise a user's own program which may send an E-mail message to the user, or operate a pager of the user's administrator or any other program the user wishes to involve. The receivers are coupled to the server processor 11 by means of busses and I/O 40, and the communication of the events is under the control of the logging processor 22. Each receiver has therefore started a thread which continues to run, and passes events provided by the server.

Other server components depicted as components 41 in FIG. 1 include, for example, central scheduling, a transaction manager, and a physical volume repository, not shown. The central scheduling component manages clients' schedules, that is, coordinating the timing for both client and server processes. The transaction manager allows grouping of transactions for later rollback or commit, e.g., back up batching of files to the data storage managed by the server runs out of space and the transaction manager rolls back the transaction (cancel and do later). Commit is when the job completes successfully and comprises doing all the updates to the server database. The physical volume repository (PVR) is a layer that manages the drives of the data storage managed by the server, and provides high level I/O code that is platform specific for the drives, one level up from the device drivers. Servers of other types may have some added or different specific components.

Many of the events are internally generated in the server 10 and many originate in the clients 15. As discussed above, some of the events may require urgent attention locally.

Still referring to FIGS. 1 and 2, some of the events are highly important, not only to the local administrator, but also from a regional, area, or an enterprise overview perspective. Hence, in accordance with the present invention, certain events are communicated between servers, possibly located at sites remote from one another and coupled by a server-to-server infrastructure. The infrastructure comprises any suitable digital communication system, and may involve satellites, fiber optic, cable or wire communications media, or any combination.

The servers are coupled in any fashion dictated by the user, possibly in an hierarchical fashion, with a local server, e.g., server A, coupled on server-to-server infrastructure 45 to a regional server B, which is in turn coupled on server-to-server infrastructure 46 to an area or an enterprise server C. To confuse the issue even more, the local server A may be physically located at a headquarters (such as the I/S department at an area headquarters) and therefore be coupled on server-to-server infrastructure 47 to the area server C and provided with events from the area server. Any combination is possible.

For the purpose of illustration, server B is illustrated as server 10 in FIG. 2, and only server 10 is described in detail with respect to FIG. 1. Each of the servers A, B and C, may be implemented as server 10 of FIG. 1 or the equivalent, and, in accordance with the present invention, each of the servers A, B and C, is provided with the computer program code of the present invention, or otherwise implements the method and server of the present invention. Hereinafter, any of the servers may be referred to as a server, a sending server, a present server, a receiving server, etc., the relationship defined by the coupling therebetween and the direction of transmission of the event.

Figure 4:
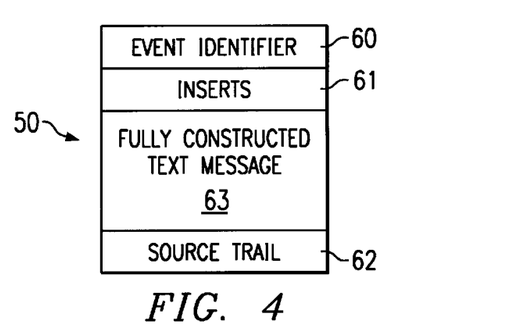
FIG. 4 is a representation of a server-to-server event in accordance with the present invention for the server of FIG. 1.

FIG. 4 illustrates an embodiment of a server-to-server event message 50 in accordance with the present invention. The event message 50 is generated by the logging processor 22 of FIG. 1, some of the components of which are illustrated in FIG. 5.

Figure 5:
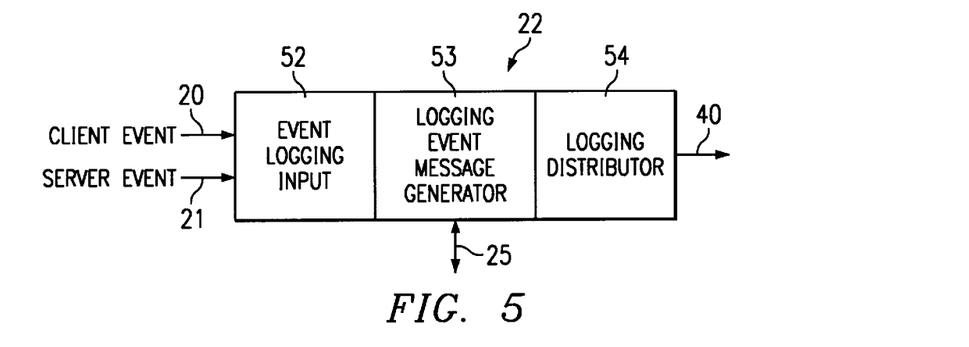
FIG. 5 is a block diagrammatic representation of a logging processor of the server of FIG. 1.

Referring to FIGS. 1, 4 and 5, the logging processor may receive events at event logging input 52 from clients 15 via session processor 20, or from the server itself, via administrative processor 21. The logging processor determines whether the received events are to be server-to-server events, for example, based on the receivers identified for the event that is received. A logging event message generator 53 is coupled to the event logging input 52, and, in response to the received event, generates the event message 50. A logging distributor 54 is coupled to the logging event message generator 53, and transmits the generated server-to-server event message, via busses and I/O 40, to a receiving server 18 and to the ones of receivers 12, 30, 32, 34, 36, 37 and 38 that are designated to receive the event. In accordance with the present invention, only one server 18 is coupled to the logging distributor 54 of the server 10. This prevents server-to-server events from being distributed to all servers, and assists in preventing loops, as will be explained.

The logging event message generator 53 responds to ones of the received client or server events for which the coupled server 17 is a receiver, by generating a server-to-server event message 50 for the received event.

The event message 50 includes 1) an event identifier 60, 2) any text insert 61 pertinent to the event message, 3) a source trail 62 indicating the origin and history of the event, and 4) a fully constructed text message 63, preferably in the primary text language of the server 10, as will be explained.

The event identifier 60 is a number or other identifier which has been defined for the particular received event. For example, ADSM may have a large number of possible events, and each event is given a specific number. Further, the events may be given different numbers if they originate from a client or from the server.

As discussed above, the logging processor 22 determines whether an event is a server-to-server event, and may do so by means of the event identifier.

Each event has a text message assigned for that event. The text message provides an explanation of the nature of the event. The event may result from the execution, or attempted execution, of a specific command, or may describe a problem resulting from the specific process, etc. The event may also relate to a specific device in or assigned to a client or a server. There also may be other specific relationships to the event. Insert locations are provided in the assigned text for the insertion of a specific command, a specific process, a specific device, and/or other specific relationships. Many events have no such relationships and do not have such insert locations. Inserts 61 comprise any of the above specific relationships that are inserted into the assigned text.

In accordance with the present invention, the logging event message generator 53, also provides a fully constructed text message 63 which incorporates the text message assigned for that event, as will be explained, together with the inserts 61.

The source trail 62 comprises a) any source trail from a sending server 16, 17 received with the event, including an identifier of any originating client 15 supplying the event, or, b) if received directly from a client 15, the identifier of the client, and c) an identifier of the present server 10, each separated by a special character. Thus, if the event originated with a client 15 having an identifier of "DD67" and the identifier of the server 10 is "AD32", the source trail will be "DD67>AD32". Any subsequent receiver will understand from the order of the source trail and the special character ">" that the event originated at device "DD67" and was forwarded by server "AD32". If the event was originated by the server 10, the source trail would comprise only the identifier "AD32".

If the event was a server-to-server event received from server 16 or from server 17 as a client input 20, it would have an existing source trail that would be received with the event. For example, the existing source trail may comprise "DE89>AD12>AD22", which would indicate that the source of the event was client node "DE89" and that the event was forwarded, first by server "AD12" and then by server "AD22". The logging event message generator 53 appends an "AD32", separating it from the existing source trail by the special character ">". The resultant source trail 62 would then comprise "DE89>AD12>AD22>AD32".

Figure 6:
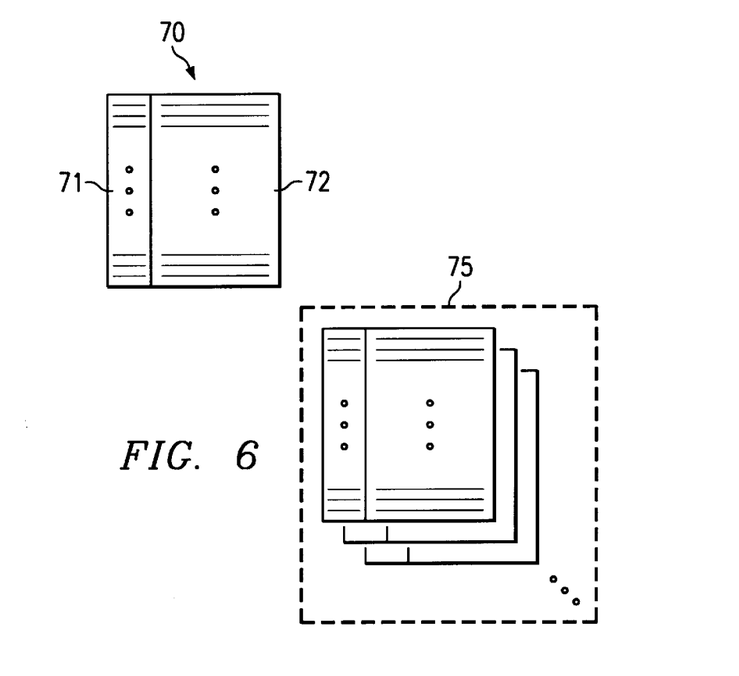
FIG. 6 is a diagrammatic illustration of event identification and language listings employed with the server of FIG. 1.

Referring to FIGS. 2 and 6, servers A, B and C, may be located at sites in different countries having different languages, or at sites in the same country having different languages, such as Switzerland, Belgium, etc. Each of the servers therefore has a primary language and a defined (or default) listing of events 70 by event identifier and corresponding text messages in the primary text language of the server. The text language for the events is thus the language of the site, so that the administrator does not have to attempt to interpret the event. In one embodiment of the invention, the listing 70 is in the form of a list of the event identifiers 71 together with the corresponding text message 72 in that language. The text message 72 has the insert locations for the insertion of the inserts 61 of FIG. 4 at the appropriate locations for the syntax of the language. The listing 70 may be stored in the server memory 25 in FIG. 1.

The server may also have additional listings 75 in other languages, and the correct language for the site may be selected when the server is first initialized.

Referring additionally to FIGS. 4 and 5, the logging event message generator 53 will employ the event identifier 60 to look up the identifier 71 of the listing of events 70, and will generate the corresponding text message 63, providing any inserts 61 at the appropriate insert locations.

Thus, if the incoming event is not in the language of the server site, the resultant event message will nonetheless be in the correct language.

As an example, the received event may comprise an event identifier "1234", and occur as the result of specific command "MOVE DATA". The insert would therefore be "INSERT_1"="MOVE DATA". An example of the English text may comprise "Process 1 terminated—sufficient database space is not available", where the "1" is the location of the insert.

The corresponding Spanish text may comprise "El proceso 1 ha finalizado—no hay suficiente espacio de base de datos disponible."

The corresponding German text may comprise "Prozeß 1 beendet—nicht genügend Datenbankbereich verfübar.", and the corresponding Brazilian text may comprises "Processo 1 terminado—não existe espaco suficiente disponivel no banco de dados."

It may be that the server 10 does not include the received event in the listing 70, for example because the listing 70 is an older version. In that case, the logging event message generator 53 repeats the fully constructed text message 63 of the received message.

Additionally, the present server detects whether the insert count, and whether the types of inserts match the text message in the text listing 72, and, if not, repeats the fully constructed text message 63 of the received message.

Referring to FIGS. 1 and 5, the logging distributor is coupled to the logging event message generator, the logging event message is now complete, and the logging distributor then distributes the event message to the appropriate receivers, including the server 18, via the busses and I/O 40.

One skilled in the art will be able to visualize alternative arrangements of the servers 10, the logging processor 22, the event message 50, and the listing 70 which incorporate the present invention.

Figure 7:
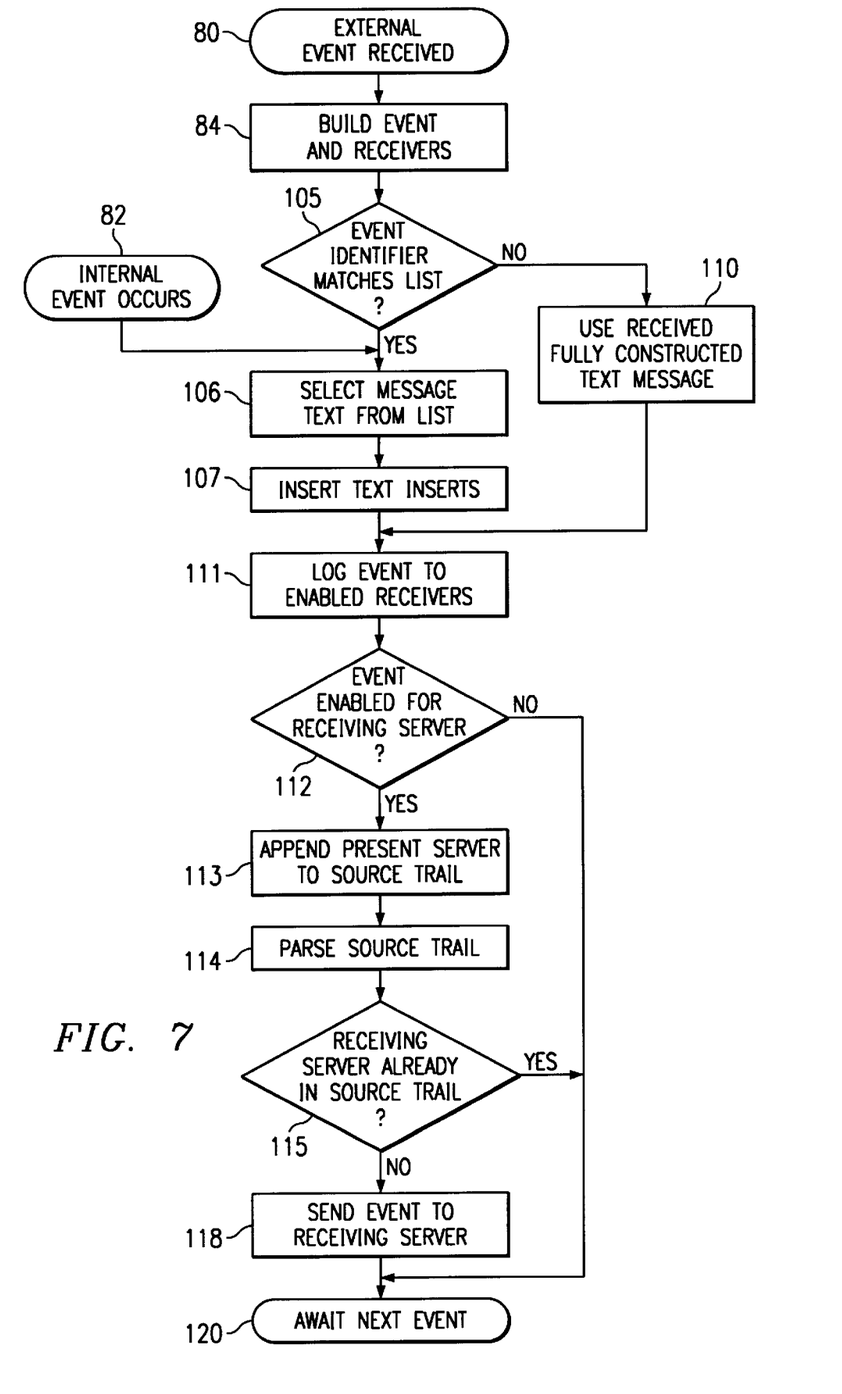
FIG. 7 is a flow chart depicting the method of the present invention.

An embodiment of the method of the present invention is illustrated in FIG. 7. The method, as discussed above, is preferably embodied by computer readable program code for operating a computer processor.

Referring to FIGS. 1, 4, 5 and 7, events are received, either in step 80 from an external client 15 or server 16, 17, via session processor 20, or in step 82 generated internally by any of the internal components, and received at event logging input 52. If the event is external, it will have an event identifier and, if received from a sending server 16, 17, will have a source trail and a fully constructed text message, as discussed above.

In step 84, the list of receivers for the external event are determined based upon the event identifier by conventional means.

If the event was internally generated in step 82, the receivers are identifiable in memory 25 for logging, also based on the event, so no list is generated.

In steps 105 and 110, the event format will be established and the event identifier from the received event is inserted as the event identifier 60 in the event message 50, as are the inserts 61. If the event is external and is from a sending server, a source trail will be provided and is repeated as source trail 62. If the event is external and is from a client node 15, the client node name is repeated as the initial identifier in the source trail 62.

Step 105 initiates the selection or definition of a fully constructed text message for an external event message. In step 105, the logging event message generator 53 employs the event identifier 60 to look up the the input event at the event list 71 of listing 70. If the identifier is in the list 71, the corresponding text message 72 is selected in step 106, and the provided text inserts 61 are inserted into the text at the designated insert locations in step 107, thereby generating the corresponding fully constructed text message 63. The identifier for the internal event is in the list, so the text message is constructed in steps 106 and 107.

If step 105 indicates that the listing 70 does not include the event identifier in list 71, or upon the insert count or insert types not matching, as discussed above, the logging event message generator 53, in step 110 utilizes the fully constructed text message from the received event message, and repeats the fully constructed text message 63 in the event message to be transmitted in the language of the sending server.

The event message is then logged to the receivers in step 111. Step 112 determines whether the event is enabled for the receiving server 18. If not, the event is conventionally logged to the enabled receivers by logging distributor 54.

If the event is enabled for the receiving server 18 as determined in step 112, making the event a server-to-server event, the logging event message generator appends, in step 113, the present server identifier to the existing source trail, separating the appended identifier from the existing source trail with a special character ">", as discussed above.

Then, in step 114, the source trail is parsed, as discussed above, so that each of the source trail identifiers may be examined.

In step 115 of FIG. 7, the logging distributor 54 examines the parsed source trail 62 of step 114 for the identifier of the coupled receiving server 18. If the identifier of server 18 of FIG. 1 is in the source trail 62, it means that the server 18 has already processed the event message. To now send the event message to server 18 would create a loop, which would unnecessarily tie up system resources and bog down the network. In step 116, the logging distributor therefore logs the event to the appropriate receivers excepting the coupled server 18, thereby avoiding a loop. As discussed above, it is advantageous to have only a single coupled server 18, so as to avoid increased complexity of step 115.

The developer may choose to ignore this precaution and, instead, allow the broadcast of the event to additional servers without departing from other aspects of the present invention.

If step 115 indicates that the identifier of the coupled receiving server 18 is absent from the source trail, the logging distributor, in step 118, logs the event to all appropriate receivers, including the coupled server 18.

With the logging of the event, the method of FIG. 7 is complete, and step 120 awaits the next event.

Alternative arrangements of the steps of method of FIG. 7, and alternative specific steps, may be envisioned by those of skill in the art, without departing from the spirit of the present invention.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method of server-to-server event logging, between a present server and a receiving server, comprising the steps of:

receiving an event at said present server for which said receiving server is a receiver, wherein said event is received directly from a client or from a sending server;

where said received event is received directly from a client; generating a server-to-server event message for said received event, said event message comprising 1) an event identifier, 2) any text insert pertinent to said event message, and 3) a source trail indicating the origin and history of said event, said source trail comprising an identifier of said client supplying said event, and an identifier of said present server, each separated by a special character;

where said received event is a server-to-server event message from a sending server, said received event message comprising 1) an event identifier, 2) any text insert pertinent to said event message, and 3) a source trail indicating the origin and history of said event, said source trail comprising any source trail from said sending server received with said event, with an identifier of said sending server, each said identifier separated by a special character; generating a server-to-server event message for said received event, said message comprising 1) said event identifier, 2) any said text insert pertinent to said event message, and 3) a source trail indicating the origin and history of said event, said source trail comprising said source trail received from said sending server with said event, and an identifier of said present server, each said identifier separated by said special character;

parsing said source trail of said received event message to determine each identifier in said source trail; and transmitting said generated server-to-server event message to said receiving server only if said receiving server identifier is absent from said parsed source trail.

2. The method of claim 1, wherein said transmitting step is limited to transmitting said generated server-to-server message to only one said receiving server.

3. The method of claim 1, wherein said present server has a primary text language, and wherein said generating step additionally comprises generating in said server-to-server event message 4) a fully constructed text message in said text language of said present server.

4. A method of server-to-server event logging between a sending server and a present server, said present server having a primary text language, said present server having a listing of events by event identifier and corresponding text messages in said primary text language of said present server having insert locations, comprising the steps of:

receiving at said present server, a server-to-server event message from said sending server, said message comprising 1) an event identifier, and 2) any text insert pertinent to said event message;

identifying, in response to said received server-to-server event message event identifier, said received event identifier in said listing;

generating said text message corresponding to said identified event identifier in said primary text language of said present server;

providing any said received text inserts at appropriate ones of said insert locations; and logging said received server-to-server event in said generated text message in said text language of said present server, with said provided text inserts.

5. The method of claim 4, wherein said sending server has a primary text language, and wherein said received server-to-server event message additionally comprises 4) a fully constructed text message in said text language of said sending server, comprising the additional step of:

upon said identifying step not identifying said event message in said listing of events, or upon an insert count or insert types not matching said insert locations of said corresponding text message, logging said received fully constructed text message.

6. A present server for logging an event to a receiving server, said event received directly from a client or from a sending server, comprising:

an event logging input for receiving events;

a logging event message generator coupled to said event logging input for generating event messages to be distributed to ones of receivers, said generator responding to ones of said received events for which said receiving server is a receiver; where said received event is received directly from a client, said generator generating a server-to-server event message for said received event, said event message comprising 1) an event identifier, 2) any text insert pertinent to said event message, and 3) a source trail indicating the origin and history of said event, said source trail comprising an identifier of said client supplying said event, and an identifier of said present server, each separated by a special character; where said received event is a server-to-server event message from a sending server, said received event message comprising 1) an event identifier, 2) any text insert pertinent to said event message, and 3) a source trail indicating the origin and history of said event, said source trail comprising any source trail received from said sending server with said event, comprising an identifier of said sending server, each said identifier separated by a special character, said generator generating a server-to-server event message for said received event, said event message comprising 1) said event identifier, 2) any said text insert pertinent to said event message, and 3) a source trail indicating the origin and history of said event, said source trail comprising said source trail received from said sending server with said event, and an identifier of said present server, each said identifier separated by said special character;

a parsing processor parsing said source trail of said received event message to determine each identifier in said source trail; and a logging distributor which transmits said generated server-to-server event message to said receiving server only if said receiving server identifier is absent from said parsed source trail.

7. The server of claim 6, wherein said logging distributor transmits said generated server-to-server message to only one said receiving server.

8. The server of claim 6, wherein said present server has a primary text language, and wherein said logging event message generator additionally generates said server-to-server event message with 4) a fully constructed text message in said text language of said present server.

9. A present server for logging a server-to-server event received from a sending server, said present server having a primary text language, comprising:

an event logging input for receiving said server-to-server events from said sending server, said event comprising a server-to-server event message from said sending server, said message comprising 1) an event identifier, and 2) any text insert pertinent to said event message;

a logging event message generator coupled to said event logging input for generating event messages to be distributed to ones of receivers, said generator having a listing of events by event identifier and corresponding text messages in said primary text language of said present server, said corresponding text messages having insert locations; said generator responding to said server-to-server event message event identifiers of said server-to-server event received at said event logging input, identifying said received event identifier in said event listing; said generator generating said text message corresponding to said identified event identifier in said present server primary text language of said present server; said generator providing any said received server-to-server event message text inserts at appropriate ones of said insert locations; and a logging distributor which transmits said generated server-to-server event message with said provided text inserts to said receivers.

10. The server of claim 9, wherein said sending server has a primary text language, and wherein said received server-to-server event message additionally comprises 4) a fully constructed text message in said text language of said sending server, and wherein said logging event message generator, upon being unable to match said event identifier in said listing of events, or upon an insert count or insert types not matching said insert locations of said corresponding text message, generates an event message for said received server-to-server event, employing said received fully constructed text message.

11. An article of manufacture comprising a computer readable medium having computer readable program code embodied therein for server-to-server event logging, between a present server and a receiving server, said present server having an event logging input for receiving events, and having a logging distributor for distributing said received events, comprising:

computer readable program code which causes a computer processor of said present server to generate event messages to be distributed to ones of receivers, said generator responding to ones of said received events for which said receiving server is a receiver, said event received directly from a client or from a sending director; where said received event is received directly from a client, generating a server-to-server event message for said received event, said message comprising 1) an event identifier, 2) any text insert pertinent to said event message, and 3) a source trail indicating the origin and history of said event, said source trail comprising an identifier of said client supplying said event, and an identifier of said present server, each separated by a special character; where said received event is a server-to-server event message from a sending server, said received message comprising 1) an event identifier, 2) any text insert pertinent to said event message, and 3) a source trail indicating the origin and history of said event, said source trail comprising any source trail from said sending server received with said event, with an identifier of said sending server, each said identifier separated by a special character, generating a server-to-server event message for said received event, said event message comprising 1) said event identifier, 2) any said text insert pertinent to said event message, and 3) a source trail indicating the origin and history of said event, said source trail comprising said source trail received from said sending server with said received event, and an identifier of said present server, each said identifier separated by said special character;

computer readable program code which causes a computer processor of said Present server to parse said source trail of said received event message from said sending server to determine each identifier in said source trail; and computer readable program code which causes a computer processor of said present server to operate said logging distributor to transmit said generated server-to-server event message to said receiving server only if said receiving server identifier is absent from said Parsed source trail.

12. The article of manufacture of claim 11, wherein said computer readable program code which causes a computer processor of said present server to operate said logging distributor, additionally operates said logging distributor to transmit said generated server-to-server message to only one said receiving server.

13. The article of manufacture of claim 11, wherein said present server has a primary text language, and wherein said computer readable program code which causes a computer processor of said present server to generate event messages, additionally causes said processor to generate said server-to-server event message with 4) a fully constructed text message in said text language of said present server.

14. An article of manufacture comprising a computer readable medium having computer readable program code embodied therein for logging a server-to-server event received by a present server from a sending server, said present server having a primary text language, said present server having an event logging input for receiving said server-to-server events from said sending server, said server-to-server event comprising a server-to-server event message from said sending server, said message comprising 1) an event identifier, and 2) any text insert pertinent to said event message, and said present server having a logging distributor for distributing said received events to receivers, comprising:

computer readable program code which causes a computer processor of said present server to have a listing of events by event identifier and corresponding text messages in said primary text language of said present server, said corresponding text messages having insert locations; to cause said computer processor to respond to said server-to-server event message event identifier of said server-to-server event received at said event logging input, identifying said received event identifier in said event listing; to cause said computer processor to generate said text message corresponding to said identified event identifier in said present server primary text language of said present server; to cause said computer processor to provide any said received server-to-server event message text inserts at appropriate ones of said insert locations; and computer readable program code which causes a computer processor of said present server to operate said logging distributor to distribute said generated server-to-server event message with said provided text inserts to said receivers.

15. The article of manufacture of claim 14, wherein said sending server has a primary text language, and wherein said received server-to-server event message additionally comprises 4) a fully constructed text message in said text language of said sending server, and wherein said computer readable program code which causes a computer processor of said present server to generate event messages, additionally causes said processor to, upon being unable to match said event identifier in said listing of events, or upon an insert count or insert types not matching said insert locations of said corresponding text message, generate an event message for said received server-to-server event, employing said received fully constructed text message.

16. A computer program product usable with a programmable computer having computer readable program code embodied therein for server-to-server event logging, between a present server and a receiving server, said present server having an event logging input for receiving events, and having a logging distributor for distributing said received events, comprising:

computer readable program code which causes a computer processor of said present server to generate event messages to be distributed to ones of receivers, said generator responding to ones of said received events for which said receiving server is a receiver, said event received directly from a client or from a sending director; where said received event is received directly from a client, generating a server-to-server event message for said received event, said message comprising 1) an event identifier, 2) any text insert pertinent to said event message, and 3) a source trail indicating the origin and history of said event, said source trail comprising an identifier of said client supplying said event, and an identifier of said present server, each separated by a special character; where said received event is a server-to-server event message from a sending server, said message comprising 1) an event identifier, 2) any text insert pertinent to said event message, and 3) a source trail indicating the origin and history of said event, said source trail comprising any source trail from said sending server received with said event, with an identifier of said sending server, each said identifier separated by a special character, generating a server-to-server event message for said received event, said event message comprising 1) said event identifier, 2) any said text insert pertinent to said event message, and 3) a source trail indicating the origin and history of said event, said source trail comprising said source trail received from said sending server with said event, and an identifier of said present server, each said identifier separated by said special character;

computer readable program code which causes a computer processor of said present server to parse said source trail of said received event message from said sending server to determine each identifier in said source trail; and computer readable program code which causes a computer processor of said present server to operate said logging distributor to transmit said generated server-to-server event message to said receiving server only if said receiving server identifier is absent from said parsed source trail.

17. The computer program product of claim 16, wherein said computer readable program code which causes a computer processor of said present server to operate said logging distributor, additionally operates said logging distributor to transmit said generated server-to-server message to only one said receiving server.

18. The computer program product of claim 16, wherein said present server has a primary text language, and wherein said computer readable program code which causes a computer processor of said present server to generate event messages, additionally causes said processor to generate said server-to-server event message with 4) a fully constructed text message in said text language of said present server.

19. A computer program product usable with a programmable computer having computer readable program code embodied therein for logging a server-to-server event received by a present server from a sending server, said present server having a primary text language, said present server having an event logging input for receiving said server-to-server events from said sending server, said server-to-server event comprising a server-to-server event message from said sending server, said message comprising 1) an event identifier, and 2) any text insert pertinent to said event message, and said present server having a logging distributor for distributing said received events to receivers, comprising:

computer readable program code which causes a computer processor of said present server to have a listing of events by event identifier and corresponding text messages in said primary text language of said present server, said corresponding text messages having insert locations; to cause said computer processor to respond to said server-to-server event message event identifier of said server-to-server event received at said event logging input, identifying said received event identifier in said event listing; to cause said computer processor to generate said text message corresponding to said identified event identifier in said present server primary text language of said present server; to cause said computer processor to provide any said received server-to-server event message text inserts at appropriate ones of said insert locations; and computer readable program code which causes a computer processor of said present server to operate said logging distributor to distribute said generated server-to-server event message with said provided text inserts to said receivers.

20. The computer program product of claim 19, wherein said sending server has a primary text language, and wherein said received server-to-server event message additionally comprises 4) a fully constructed text message in said text language of said sending server, and wherein said computer readable program code which causes a computer processor of said present server to generate event messages, additionally causes said processor to, upon being unable to match said event identifier in said listing of events, or upon an insert count or insert types not matching said insert locations of said corresponding text message, generate an event message for said received server-to-server event, employing said received fully constructed text message.

\* \* \* \* \*